(12) United States Patent
Yamasaki et al.

(10) Patent No.: US 9,891,061 B2
(45) Date of Patent: Feb. 13, 2018

(54) DETERMINING AREAS TO AVOID FOR NAVIGATION GUIDANCE

(71) Applicant: Toyota Motor Engineering & Manufacturing North America, Inc., Erlanger, KY (US)

(72) Inventors: Bryan E. Yamasaki, Ypsilanti, MI (US); Sean L. Helm, Saline, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 15/095,119

(22) Filed: Apr. 10, 2016

(65) Prior Publication Data

US 2017/0292845 A1 Oct. 12, 2017

(51) Int. Cl.
| G06G 7/70 | (2006.01) |
| G08B 21/00 | (2006.01) |
| G01C 21/34 | (2006.01) |
| G01C 21/36 | (2006.01) |
| G08G 1/0965 | (2006.01) |

(52) U.S. Cl.
CPC ..... *G01C 21/3415* (2013.01); *G01C 21/3492* (2013.01); *G01C 21/3694* (2013.01); *G08G 1/0965* (2013.01)

(58) Field of Classification Search
USPC .......................................... 701/117; 340/540
See application file for complete search history.

(56) References Cited

U.S. PATENT DOCUMENTS

| 8,155,865 B2 | 4/2012 | Bicego, Jr. | |
| 2008/0303660 A1* | 12/2008 | Lombardi | G08G 1/0965 340/540 |
| 2009/0248283 A1* | 10/2009 | Bicego, Jr. | G01C 21/3691 701/117 |
| 2011/0034183 A1* | 2/2011 | Haag | G06Q 50/26 455/456.3 |
| 2011/0043377 A1 | 2/2011 | McGrath et al. | |
| 2013/0276065 A1* | 10/2013 | Kumar | H04L 63/062 726/3 |
| 2014/0032114 A1* | 1/2014 | Titus | G01C 21/3453 701/537 |
| 2015/0109122 A1* | 4/2015 | Stern | G08B 27/008 340/539.1 |
| 2015/0221218 A1 | 8/2015 | Downs et al. | |

* cited by examiner

*Primary Examiner* — Tyler Paige
(74) *Attorney, Agent, or Firm* — Christopher G. Darrow; Darrow Mustafa PC

(57) ABSTRACT

Systems and methods are provided for updating vehicle navigation guidance systems. The methods may comprise receiving an audible emergency broadcast, and scanning the audible emergency broadcast for a plurality of predetermined key terms. Upon detecting a presence of at least one of the plurality of predetermined key terms, the method may include analyzing an additional portion of the audible emergency broadcast for vehicular traffic information. The method includes determining at least one incident location to have a potential of being affected by the vehicular traffic information. The method may include providing an update, alert, or information related to the vehicular traffic information to at least one vehicle within a certain distance to the incident location, or to at least one vehicle currently routed through the incident location.

19 Claims, 2 Drawing Sheets

US 9,891,061 B2

DETERMINING AREAS TO AVOID FOR NAVIGATION GUIDANCE

TECHNICAL FIELD

The present disclosure generally relates to vehicle navigation guidance, and more particularly, to systems and methods for updating vehicle navigation guidance systems with information obtained from emergency broadcasts.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Vehicle navigation guidance systems are increasingly popular, and can include traffic and weather related information that may be used to provide a vehicle operator with route guidance options preferably minimizing commute times and/or avoiding certain traffic or weather conditions. The underlying data related to the traffic and weather can originate from various sources, including third party or commercial service providers that collect and sell data as a subscription package to consumers. For example, traffic data collection services may provide information through certain communication protocols available to vehicles for incorporation with the vehicle navigation guidance systems. The underlying data may also come from traffic software/applications that gather information and input from people near an accident or situation, using various smart devices. Although data gathering technology rapidly changes and evolves, there still remains a need to incorporate data obtained from conventional natural language emergency broadcasts and similar alerts.

Accordingly, it would be desirable to provide an improved navigation guidance system that allows for the incorporation of emergency broadcasts, while minimizing additional work.

SUMMARY

This section provides a general summary of the disclosure, and is not a comprehensive disclosure of its full scope or all of its features.

In various aspects, the present teachings provide a method for updating a navigation guidance system. The method comprises receiving an audible emergency broadcast, and scanning a first portion of the audible emergency broadcast for a plurality of predetermined key terms. The method includes detecting a presence of at least one of the plurality of predetermined key terms. Once detected, the method analyzes a second portion of the audible emergency broadcast for vehicular traffic information. An incident location having a potential of being affected by the vehicular traffic information is determined. The method includes providing an update containing data related to the vehicular traffic information to the navigation guidance system of a vehicle.

In other aspects, the present teachings provide a method for updating a vehicle navigation guidance system. The method comprises receiving a plurality of audible emergency broadcasts. A first portion of each audible emergency broadcast is scanned for a plurality of predetermined key terms. The method may include detecting a presence of at least one of the plurality of predetermined key terms in a relevant audible emergency broadcast, and identifying a second portion of the relevant audible emergency broadcast having the at least one predetermined key term. The second portion of the relevant audible emergency broadcast may be analyzed for vehicular traffic information. The method may include determining an incident location having a potential of being affected by the vehicular traffic information, as well as determining that a confidence level of at least one of the vehicular traffic information and the incident location exceeds a threshold value. An update containing data related to the vehicular traffic information may then be provided to the navigation guidance system of a vehicle.

In still other aspects, the present teachings provide an emergency broadcast monitoring system. The system may comprise one or more audio sensors configured to receive audible emergency broadcasts, and a computing device in communication with the one or more audio sensors. The computing device may include one or more processors for controlling operations of the computing device, and a memory for storing data and program instructions used by the one or more processors. The one or more processors may be configured to execute instructions stored in the memory to receive, from the audio sensors, an audible emergency broadcast. The instructions may direct the scanning of a first portion of the audible emergency broadcast for a plurality of predetermined key terms. The one or more processors may be configured to execute instructions stored in the memory to detect a presence of at least one of the plurality of predetermined key terms, and analyze a second portion of the audible emergency broadcast for vehicular traffic information. The processors may determine an incident location having a potential of being affected by the vehicular traffic information, and provide an update containing data related to the vehicular traffic information to the navigation guidance system of a vehicle.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present technology generally provides systems and methods for updating vehicle navigation guidance systems based on information obtained from one or more audible, or natural language, emergency broadcasts. The methods may generally comprise receiving an audible emergency broadcast, and scanning the audible emergency broadcast for a plurality of predetermined key terms that may have been tagged or classified as significant because of their consistent relevancy to traffic and/or weather information. Upon detecting a presence of at least one of the plurality of predetermined key terms in the audible emergency broadcast, the methods may include analyzing an additional portion of the audible emergency broadcast for vehicular traffic information related to the traffic and/or weather information. The method may include determining at least one incident location to have a potential of being affected by the vehicular traffic information. The method may then include providing an update, alert, or information related to the vehicular traffic information to at least one vehicle within a certain distance to the incident location, or to at least one vehicle currently routed through, adjacent, or near the incident location. In certain aspects, the method may include determining a confidence level of the incident location or vehicular traffic information, and providing different alerts for different confidence levels.

Figure 1:
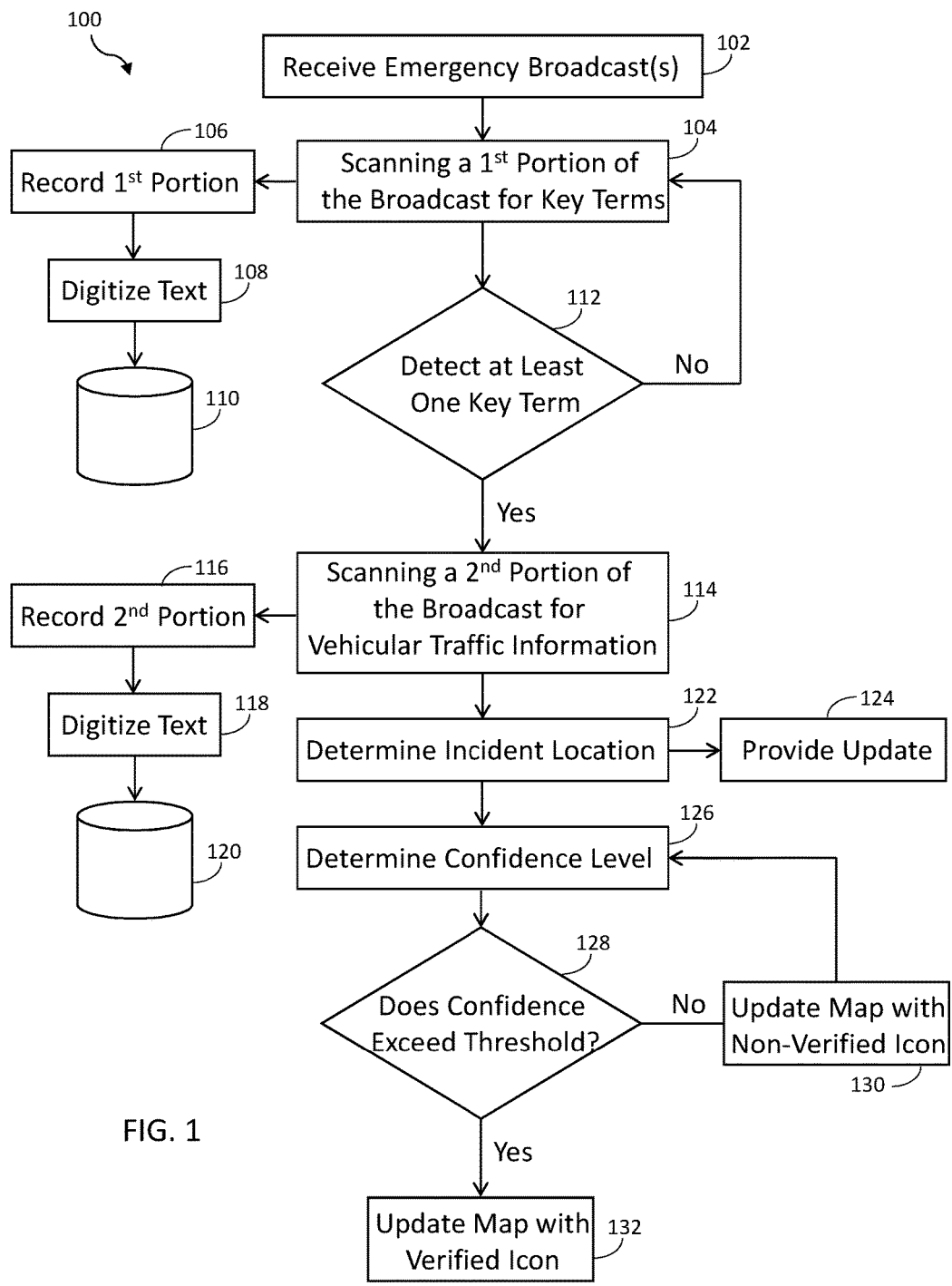
FIG. 1 illustrates a high level flowchart of exemplary operations of a method for updating navigation guidance systems of a vehicle according to various aspects of the present technology.
Figure 2:
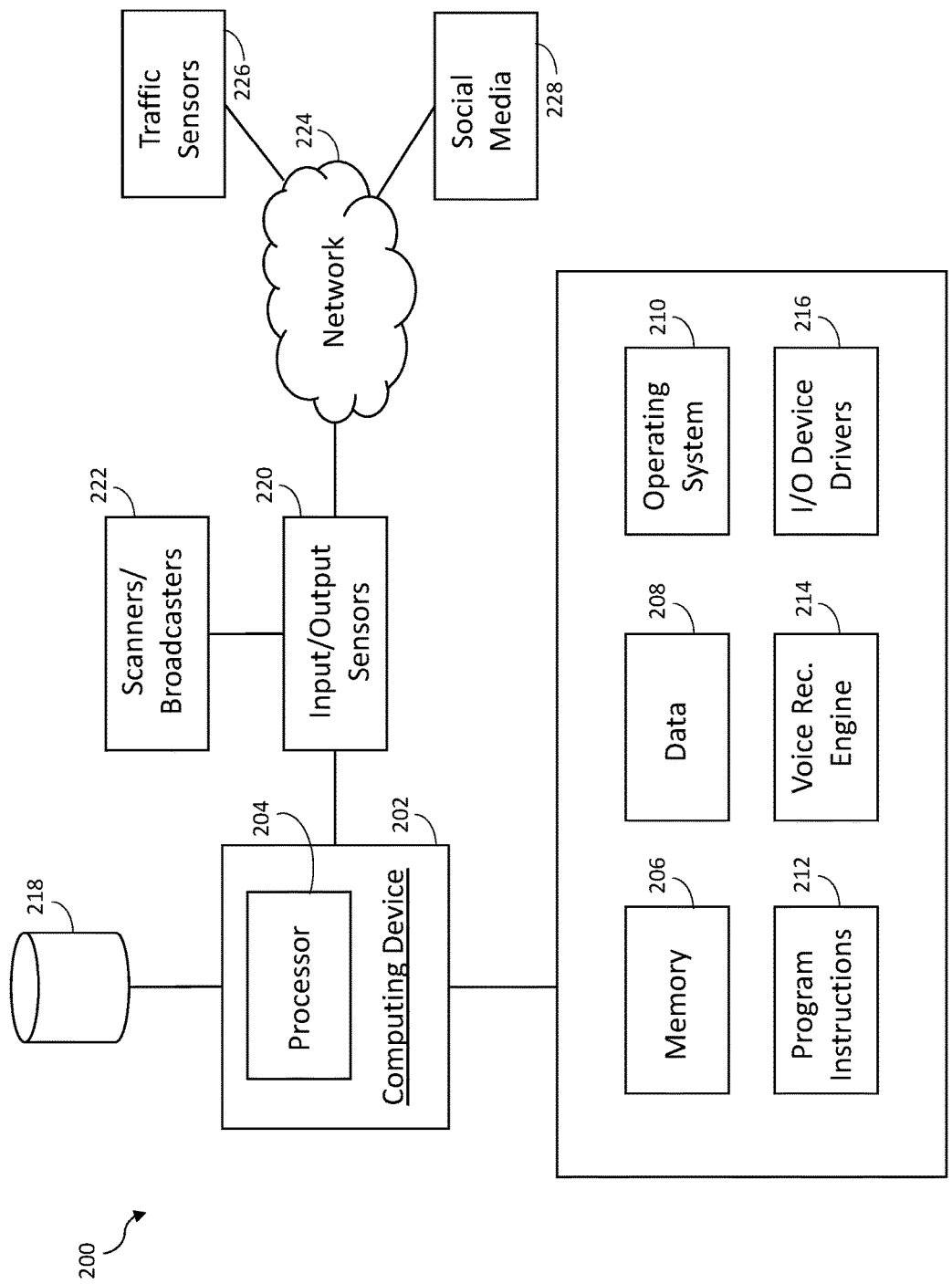
FIG. 2 illustrates an exemplary emergency broadcast monitoring system that may be used with various aspects of the present technology for updating navigation guidance systems of a vehicle.

FIG. 1 illustrates a high level flowchart of exemplary operations of a method 100 for updating navigation guidance systems of a vehicle according to various aspects of the present technology. FIG. 2 illustrates an exemplary emergency broadcast monitoring system 200 that may be used with various aspects of the present technology for updating navigation guidance systems of a vehicle.

With an initial reference to FIG. 1, a method 100 for updating navigation guidance systems of a vehicle may generally begin by receiving an audible emergency broadcast 102. As will be explained in more detail below, certain methods may include receiving a single audible emergency broadcast, while other methods may include receiving a plurality of different audible emergency broadcasts. By way of example, emergency broadcasts may generally include publically available audible broadcasts that contain natural, spoken language and are transmitted via conventional radio, video, or the like. Emergency broadcasts may be provided by government agencies or private companies. Non-limiting examples may be broadcasts from various police scanners, radio scanners, state and local authority warning systems, the Emergency Alert System (EAS), the Integrated Public Alert and Warning System (IPAWS), citizens band (CB) radios, weather radios, amateur radios, traffic announcements from a DAB Traffic News Station, and various other public alert and warning systems.

With reference to step 104, the method may include scanning, or analyzing, at least a first portion of the audible emergency broadcast(s) for predetermined key terms that have a likelihood to be related to traffic and/or weather conditions. The key term may serve as an initial indicator that vehicular traffic information may be present in the broadcast. In various aspects, the audible emergency broadcast may be scanned continuously, for as long as it is broadcasting. As shown in step 106, the audible emergency broadcast may be captured or recorded via known digital or analog means. In one example, the audible emergency broadcast may be continuous recorded, or recorded in a loop that is scanned and subsequently deleted if no key terms have been detected or after a specified period of time. The recording, or utterances extracted or taken out from the first portion, can be transformed into a digital format, such as digitized text using a voice recognition engine or the like, as shown in step 108. The digitized text can thus be scanned, searched, construed, or otherwise interpreted for the presence of at least one of a plurality of predetermined key term(s). The predetermined key terms may be stored in applicable memory or stored in a database as referenced by step 110. It should be understood that the predetermined key terms can also be modified as desired.

In various aspects, the predetermined key terms include natural language words or phrases that are generally related to ground vehicle navigation. However, it should also be understood that the present technology is similarly applicable with air traffic and/or marine traffic. The predetermined key terms preferably include a wide range of words and/or phrases that would be useful for the route planning of a vehicle using a navigation guidance system. The key terms can include words may be indicative of situations that cause or lead to travel delays, such as "motor vehicle accident," "incident," "pile-up," "back-up," "fender-bender," "congestion," "traffic," "police stop," "injury," "roadblock," "slow flow," "ambulance," "wrecker," "tow truck," "road construction," "object in road," "road hazard," "road condition," "road flooding," "road ponding," "black ice," "low visibility," "foggy," "high winds," "downpour," "white-out," and variants thereof.

The predetermined key terms may include universal police and law enforcement acronyms, codes, and jargon, such as 10-75 (severe weather statement), 10-78 (send ambulance), 10-79 (send wrecker), 11-80 (traffic accident, serious injury), 11-81 (traffic accident, minor injury), and 11-82 (traffic accident, no injury). The predetermined key terms can be customized for certain locations and the database may be updated as may be necessary.

As shown with respect to method box 112, if no predetermined key term(s) is detected, the methods may proceed by repeating steps 104-110, with continued monitoring of the emergency broadcast(s) until such a detection is eventually made. Alternatively, as shown with respect to method box 114, if at least one predetermined key term is detected, the methods may include scanning, extracting, construing, or otherwise interpreting a second portion of the audible emergency broadcast, preferably for vehicular traffic information.

As shown in step 116, the second portion of the audible emergency broadcast, which in certain aspects may also include all or a part of the first portion of the audible emergency broadcast, can be recorded via known digital or analog means. As described above with respect to the first portion, the second portion of the audible emergency broadcast may be continuously recorded and subsequently deleted if no relevant vehicular traffic information has been detected, or after a specified period of time. The recording, a portion of the recording, or one or more utterances extracted or taken out of the second portion can be transformed into digitized text using a voice recognition engine or the like, as shown in step 118. The digitized text can thus be scanned, or searched, for the presence of more detailed vehicular traffic information and term(s) that may be stored in a database(s) as indicated by reference number 120.

For example, the second portion of the broadcast can be scanned, extracted, and used to obtain further details related to the detected key term. In various aspects, different algorithms may be used depending on whether the detected key term is traffic or weather related. For example, information obtained from the second portion of the broadcast may confirm that a multi-vehicle accident is in a certain lane of a certain highway. The second portion of the broadcast may also be used to search for street names, addresses, intersections, mile markers, interstates, highways, cities, towns, counties, borders, landmarks, points of interest, stores, restaurants, geographic reference points, and the like. In various aspects, the database(s) used in the analysis of the second portion can include information commonly found in a map database, or the like. In certain aspects, it may be desirable to limit the database or restrict the analysis to certain geographic areas of relevance so as to avoid unrelated results or to improve efficiency.

It should also be understood that in various aspects, the steps of scanning a first portion of the broadcast, generally represented by reference numbers 104-110, and scanning a second portion of the broadcast, generally represented by reference numbers 114-120 could be combined and performed substantially at the same time; thus, it may be possible that they could be performed in series or in parallel with one another.

With reference to method box 122, if vehicular traffic information has been detected and/or obtained, the methods may further include determining an incident location, e.g., an approximate or actual location that may ultimately be affected by the detected traffic and/or weather. In other words, the incident location may be a location capable of being defined with enough specificity to be identified on a map, and having a potential or likelihood of being affected by the vehicular traffic information. An incident location may be a location, intersection, or boundary area that should be avoided for route guidance purposes. In various aspects, the incident location preferably includes GPS coordinates, an address, specific intersection(s), road portion, or other geographic location information sufficient to provide an update, alert, or notification useful with a navigation guidance system for a vehicle. In various aspects, it may be determined that the incident location is limited to a specific section of a road or highway, for example, northbound interstate 75 between exits 3 and 4. In various other aspects, it may be determined that the incident location is a specific address. In still other aspects, the incident location may be a general area or vicinity, with or without clear metes and bounds.

With reference to method box 124, once an incident location is determined to have a potential of being affected by the vehicular traffic information, an update containing data related to the vehicular traffic information can be provided to a navigation guidance system of a vehicle. In various aspects, the step of providing the update can include providing an HD radio signal, and RBDS/RDS signal, or the like, to a telematics component, head unit, or electronics controller of a specific vehicle. In other aspects, updates can be provided to call centers or third parties that subsequently provide traffic or weather updates to navigation guidance systems.

Non-limiting examples of the update, or alert, may include text to be presented on a navigation system display, audio to be played in the vehicle, and/or an icon to be displayed on a navigation system map. The update, or alert, may additionally or alternatively include instructions for re-routing a vehicle to avoid a certain area based on the vehicular traffic information and/or the incident location. In various aspects, the methods may include determining whether the vehicle is within a predetermined distance from the incident location prior to providing the update containing data related to the vehicular traffic information. In various other aspects, the methods may include determining whether the vehicle is currently being routed by the navigation guidance system to the incident location prior to providing the update. For example, if it is determined the vehicle is headed in a direction opposite the incident location, there may not be a need or desire to provide an update or alert.

It is envisioned that the present technology will be automated to the fullest extent possible. However, in certain instances, the information obtained or extracted from the audible emergency broadcast may be incomplete or have a degree of uncertainty. Thus, in various aspects, it may be desirable to obtain or determine a confidence level regarding the accuracy of the traffic information and/or the incident location prior to providing an update or alert. In various aspects, it may be desirable to provide different types of alerts, depending on the confidence level. The confidence level can be obtained with or without the assistance of a human operator.

In one example, and with reference to method boxes 126 and 128 of FIG. 1, the methods may include determining a confidence level, and determining whether the confidence level exceeds a threshold prior to providing certain updates or alerts. The threshold could be represented as a percentage, or a scaled value representing a likelihood of being accurate. In another example, different confidence levels may result in different types of updates or alerts. For example, certain updates may represent a non-verified event, while certain other updates may represent a verified event. The step of determining a confidence level may include performing at least one validation check to confirm an accuracy of at least one of the vehicular traffic information and the incident location. Where accuracy is important, various methods may comprise confirming the accuracy of at least one of the vehicular traffic information and the incident location using at least two or more additional sources.

In various aspects, a validation check may include confirming an accuracy of at least one of the vehicular traffic information and the incident location using information obtained from a traffic sensor, such as a traffic camera and/or speed data. In other aspects, the validation check may include confirming an accuracy of at least one of the vehicular traffic information and the incident location using information obtained from a social network or social networking service, or another type of traffic application that obtains input from users.

The validation checks may be performed automatically, and/or manually performed or reviewed by a person. The validation/accuracy steps may be performed locally or remotely via a suitable network. In one example, if an incident location is near a traffic camera, video or images from the traffic camera can be reviewed for potential traffic congestion or weather related events. If traffic congestion is verified and detected near the incident location, the confidence level may be increased. Alternatively, if traffic congestion is not detected, the confidence level may be decreased, and the situation may continue to be monitored. The traffic sensors may also provide information as to the direction and magnitude of the congestion, such as east bound or north bound traffic, etc.

If it is determined that a confidence level falls short of a certain threshold for accuracy, it may be determined that an update or alert should not be sent at that time. In another aspect, however, it may be desirable to provide an update or alert that is preliminary in nature, or that is provided with a caveat that the accuracy of the information has not yet been determined.

Thus in one example, where it is determined that a confidence level of at least one of the vehicular traffic information and the incident location falls below a threshold value, the methods may include obtaining GPS coordinates of the incident location, and providing an update, alert, and/or suitable instructions to the navigation guidance system for displaying a first icon, or the like, on a map at the GPS coordinates, wherein it is understood that the first icon represents a location of a non-verified event.

In another example, where it is determined that a confidence level of at least one of the vehicular traffic information and the incident location exceeds a threshold value, the methods may include obtaining GPS coordinates of the incident location, and providing a suitable update, alert, and/or instructions to the navigation guidance system for displaying a second icon, or the like, on a map at the GPS coordinates, wherein it is understood that the second icon represents a location of a verified event. In situations where a non-verified event is later verified, the methods may include changing the first icon to the second icon.

With renewed reference to FIG. 2, an exemplary emergency broadcast monitoring system is provided, designated by reference number 200. In various aspects, the system 200 may include a computing device 202 and one or more processors 204 for controlling various operations of the computing device 202. As is known in the art, the computing device 202 is provided with suitable memory 208 such as a non-transitory computer readable medium that may be configured for storing various data 208 and an operating system 210. The computing device 202 may include various program instructions 212 that can be executed by the processor 204 in order to carry out the method steps as described in detail above.

The system 200 may include one or more voice recognition engines 214 and any necessary I/O device drivers 216 that can be configured for transforming natural language, such as utterances from the first portion and the second portion of the audible emergency broadcasts into a digital format for detecting the presence of at least one of the plurality of predetermined key terms and vehicular traffic information that may be stored in a relevant database 218. The system may include various input and output sensors 220, such as audio sensors that may include microphones, ports, and suitable peripherals for connecting to or otherwise receiving audio from a suitable scanner/broadcaster 222 as described above. In various aspects, the system may be provided with access to one or more networks 224, including the internet, for obtaining and transferring additional information.

In certain aspects, for example, the scanner 222 may be local to the computing device 202. In other aspects, the computing device 202 may be coupled to a plurality of scanners 222 through various respective input sensors 220, or through the network 224. The network 224 may provide access to streaming scanner broadcasts. The network 224 may also provide access to various traffic related sensors 226 and sources of traffic related information, such as traffic cameras and highway speed related data, as well as provide access to social media 228, third party call centers, and traffic management systems.

In various aspects, the computing device 202 can be configured to analyze a plurality of audible emergency broadcasts received from multiple devices at the same time. The computing device may otherwise be in a constant "standby mode," ready to scan a first portion of the audible emergency broadcast for at least one predetermined key term that may serve as an indicator that relevant vehicular traffic information may be contained within the audible emergency broadcast.

The foregoing description is provided for purposes of illustration and description and is in no way intended to limit the disclosure, its application, or uses. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

It should be understood that the term vehicle should not be construed narrowly, and should include all types of vehicles, with non-limiting examples including a passenger car, truck, motorcycle, off-road vehicle, bus, boat, airplane, helicopter, lawn mower, recreational vehicle, amusement park vehicle, farm vehicle, construction vehicle, tram, golf cart, train, trolley, or the like.

As used herein, the phrase at least one of A, B, and C should be construed to mean a logical (A or B or C), using a non-exclusive logical "or." It should be understood that the various steps within a method may be executed in different order without altering the principles of the present disclosure.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

What is claimed is:

1. A method for updating a navigation guidance system of a vehicle, the method comprising:
   receiving an audible emergency broadcast;
   scanning a first portion of the audible emergency broadcast for a plurality of predetermined key terms;
   detecting a presence of at least one of the plurality of predetermined key terms in the first portion of the audible emergency broadcast;
   analyzing a second portion of the audible emergency broadcast for vehicular traffic information;
   determining the vehicle is within a predetermined distance from an incident location affected by the vehicular traffic information; and
   providing an update containing data related to the vehicular traffic information to the navigation guidance system of the vehicle.

2. The method according to claim 1, further comprising obtaining GPS coordinates of the incident location and providing instructions to the navigation guidance system for displaying a first icon on a map at the GPS coordinates, the first icon representing a non-verified event.

3. The method according to claim 2, further comprising determining a confidence level of at least one of the vehicular traffic information and the incident location.

4. The method according to claim 3, wherein determining the confidence level comprises performing a validation check to confirm an accuracy of at least one of the vehicular traffic information and the incident location.

5. The method according to claim 4, further comprising providing instructions to the navigation guidance system for displaying a second icon on the map at the GPS coordinates, the second icon representing a verified event.

6. The method according to claim 4, wherein the validation check comprises confirming the accuracy of at least one of the vehicular traffic information and the incident location using at least two additional sources.

7. The method according to claim 4, wherein the validation check comprises confirming the accuracy of at least one of the vehicular traffic information and the incident location using information from a traffic camera.

8. The method according to claim 4, wherein the validation check comprises confirming the accuracy of at least one of the vehicular traffic information and the incident location using information from a social network.

9. The method according to claim 1, further comprising determining the vehicle is currently being routed by the navigation guidance system to the incident location prior to providing the update containing data related to the vehicular traffic information to the navigation guidance system of the vehicle.

10. The method according to claim 9, further comprising providing instructions to the navigation guidance system for re-routing the vehicle based on the vehicular traffic information.

11. The method according to claim 1, wherein the step of providing the update containing data related to the vehicular traffic information to the navigation guidance system of the vehicle comprises providing an HD radio signal to a head unit of the vehicle.

12. The method according to claim 1, further comprising transforming utterances from the first portion of the audible emergency broadcast into a digital format for detecting the presence of at least one of the plurality of predetermined key terms stored in a database.

13. The method according to claim 1, comprising receiving the audible emergency broadcast from at least one of a police scanner and a weather radio.

14. A method for updating a navigation guidance system of a vehicle, the method comprising:
   receiving a plurality of audible emergency broadcasts;
   scanning a first portion of each audible emergency broadcast for a plurality of predetermined key terms;
   detecting a presence of at least one of the plurality of predetermined key terms in a relevant audible emergency broadcast;
   identifying a second portion of the relevant audible emergency broadcast having the at least one predetermined key term, and analyzing the second portion of the relevant audible emergency broadcast for vehicular traffic information;
   determining the vehicle is within a predetermined distance from an incident location affected by the vehicular traffic information;
   determining a confidence level of at least one of the vehicular traffic information and the incident location exceeds a threshold value; and
   providing an update containing data related to the vehicular traffic information to the navigation guidance system of the vehicle.

15. The method according to claim 14, further comprising:
   determining the confidence level of at least one of the vehicular traffic information and the incident location falls below a threshold value;
   obtaining GPS coordinates of the incident location; and
   providing instructions to the navigation guidance system for displaying a first icon on a map at the GPS coordinates, the first icon representing a non-verified event.

16. The method according to claim 14, further comprising:
   determining the confidence level of at least one of the vehicular traffic information and the incident location exceeds a threshold value;
   obtaining GPS coordinates of the incident location; and
   providing instructions to the navigation guidance system for displaying a second icon on a map at the GPS coordinates, the second icon representing a verified event.

17. The method according to claim 14, wherein the step of providing the update containing data related to the vehicular traffic information to the navigation guidance system of the vehicle comprises providing an HD radio signal to a head unit of the vehicle.

18. An emergency broadcast monitoring system, comprising:
   one or more audio sensors configured to receive audible emergency broadcasts; and
   a computing device in communication with the one or more audio sensors, comprising:
      one or more processors for controlling operations of the computing device; and
      a non-transitory computer readable medium for storing data and program instructions used by the one or more processors, wherein the one or more processors are configured to execute instructions stored in the non-transitory computer readable medium to:
         receive, from the audio sensors, an audible emergency broadcast;
         scan a first portion of the audible emergency broadcast for a plurality of predetermined key terms;

detect a presence of at least one of the plurality of predetermined key terms;

analyze a second portion of the audible emergency broadcast for vehicular traffic information;

determine a vehicle is within a predetermined distance from an incident location affected by the vehicular traffic information; and provide an update containing data related to the vehicular traffic information to a navigation guidance system of the vehicle.

19. The emergency broadcast monitoring system according to claim 18, wherein the processors are further configured to execute instructions stored in the non-transitory computer readable medium to:

transform utterances from the first portion of the audible emergency broadcast into a digital format for detecting the presence of at least one of the plurality of predetermined key terms stored in a database.

\* \* \* \* \*